United States Patent [19]
Chen

[11] Patent Number: 5,374,854
[45] Date of Patent: Dec. 20, 1994

[54] AUTOMATIC SWITCH FOR CONTROLLING ELECTRIC APPLIANCES

[76] Inventor: Shih-tsan Chen, 3rd Fl., No. 2, Lane 51, Jyh Cheng Rd., Sec. 2, Taipei, Taiwan, Prov. of China

[21] Appl. No.: 910,753

[22] Filed: Jul. 8, 1992

[51] Int. Cl.$^5$ ............................................. H01H 35/00
[52] U.S. Cl. ..................................... 307/117; 307/116
[58] Field of Search ............... 307/112, 116, 117, 125, 307/127, 139, 141

[56] References Cited
U.S. PATENT DOCUMENTS

| | | |
|---|---|---|
| 4,305,006 | 12/1981 | Walthall et al. ..................... 307/117 |
| 4,305,021 | 12/1981 | Schreiden ........................... 307/117 |
| 4,843,283 | 6/1989 | Chen .................................. 307/117 |
| 4,934,156 | 1/1976 | Galemmo et al. ................... 307/117 |

*Primary Examiner*—Jeffrey A. Gaffin
*Attorney, Agent, or Firm*—Morton J. Rosenberg; David I. Klein

[57] ABSTRACT

An automatic switch is provided which includes a motion detector, a filter and amplifier circuit, a direction discrimination circuit and a processing circuit for controlling electrical load such as lights or home appliances in a room. The motion detector employs a pyroelectric infra-red detector for detecting the number of persons entering and leaving the room. The detector sends signals with phase differences to the processing circuit for counting. When the number of persons entering the room is greater than that of the number of persons leaving the room, the processing circuit automatically turns the lights on. Opposingly, when the number of persons entering the room is less than the number of persons leaving the room, the processing circuit turns the lights off.

7 Claims, 8 Drawing Sheets

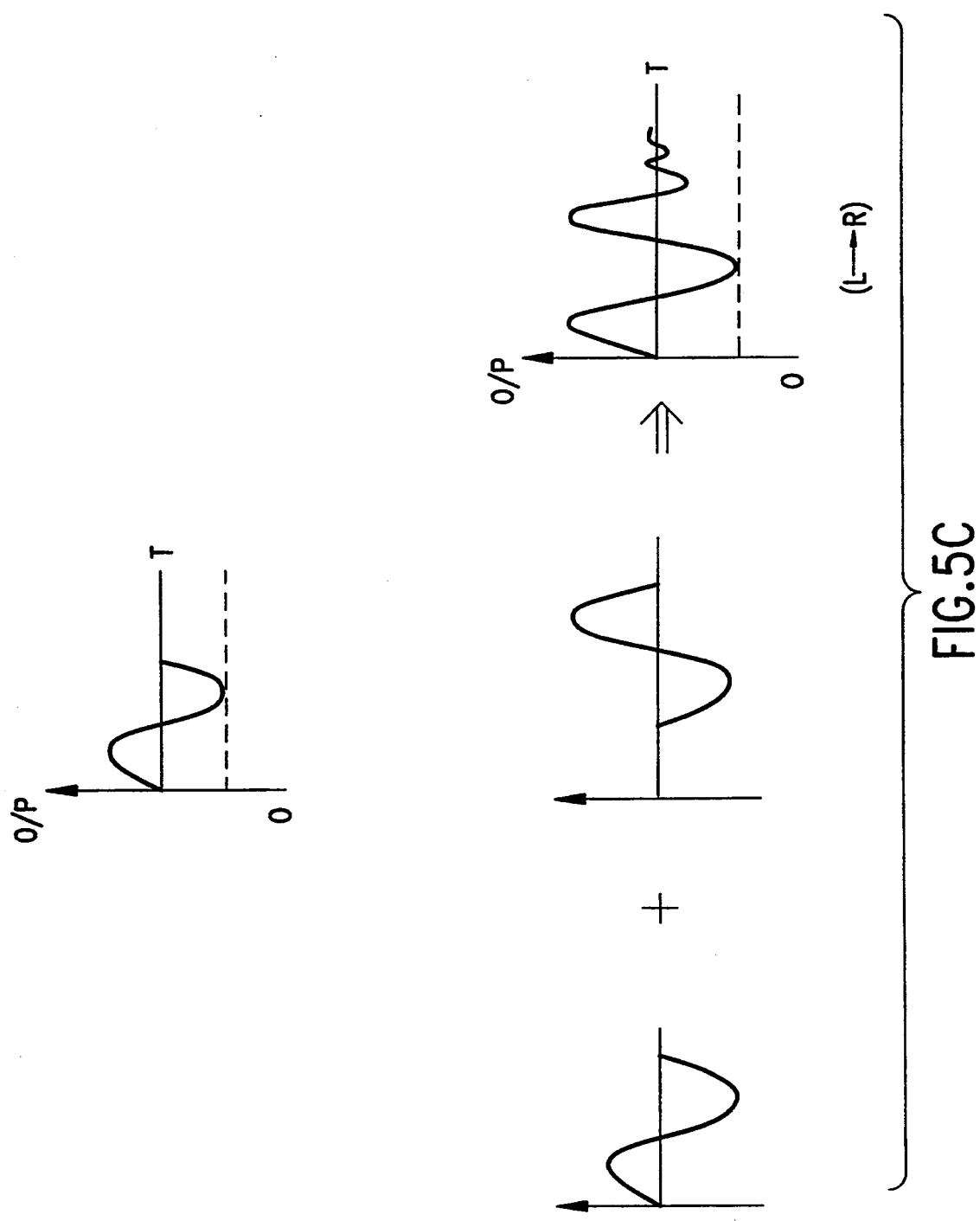

AUTOMATIC SWITCH FOR CONTROLLING ELECTRIC APPLIANCES

BACKGROUND OF THE INVENTION

The present invention relates to an automatic switch for controlling electric loads; and more particularly to an intelligent automatic switch which includes the functions of counting and storing in memory the net number of persons entering and leaving an enclosure or room to automatically control actuation/deactuation of lights or other home appliances to the room or enclosure.

Switches with automatic control capabilities are widely used for security or personal convenience in both residential and industrial applications. Most of the conventional automatic switches in the prior art simply turn on electric lights whenever a person moves through a detection pattern of a motion detector. Typically, conventional automatic switches employ a pyroelectric infra-red detector known as PIR detector as the motion detector for sensing the infrared energy emitted by a human body. However, the infrared motion detector is limited by its limited detection pattern and often cannot cover the entire area or volume of a room. Although the problem may be solved by positionally locating more sensors in the enclosure or room, this possible solution will increase the system costs. Furthermore, the detection pattern of the detector may still be blocked by furniture or other objects in the room and the switch may erroneously actuate appliances.

SUMMARY OF THE INVENTION

It is the primary object of the present invention to provide an automatic switch for controlling lights in a room which is capable of counting and storing in memory the net number of persons entering and leaving a room, and correspondingly turning appropriate appliances and lights on/off. In the preferred embodiment of the present invention, the automatic switch includes a PIR motion detector used to sense the infrared energy emitted by a person. The sensed signal is then supplied to a direction discrimination circuit through a filtering amplifier in order to be separated into a pair of output signals having phase differential. A processing circuit is used to receive the separated output signals for counting, comparing and storing the net transport of persons entering and leaving the room. According to the calculated and stored result, the processing circuit automatically actuates/deactuates the lights or other electric appliances within the room via a driving circuit.

It is another object of the present invention to provide an automatic switch with function keys including a light adjusting key, a manual on/off key, and a sleep mode key. The switch will be reset by depressing the manual on/off key and sleep mode key simultaneously to clear the data stored in the processing circuit.

Other objects of the present invention will become apparent from the following detailed description with reference to the accompanying drawings.

DESCRIPTION OF THE DRAWINGS

FIG. 5C shows a signal waveform when motion is detected in a first direction.

DETAILED DESCRIPTION OF THE PREFERRED EMBODIMENT

Figure 1:
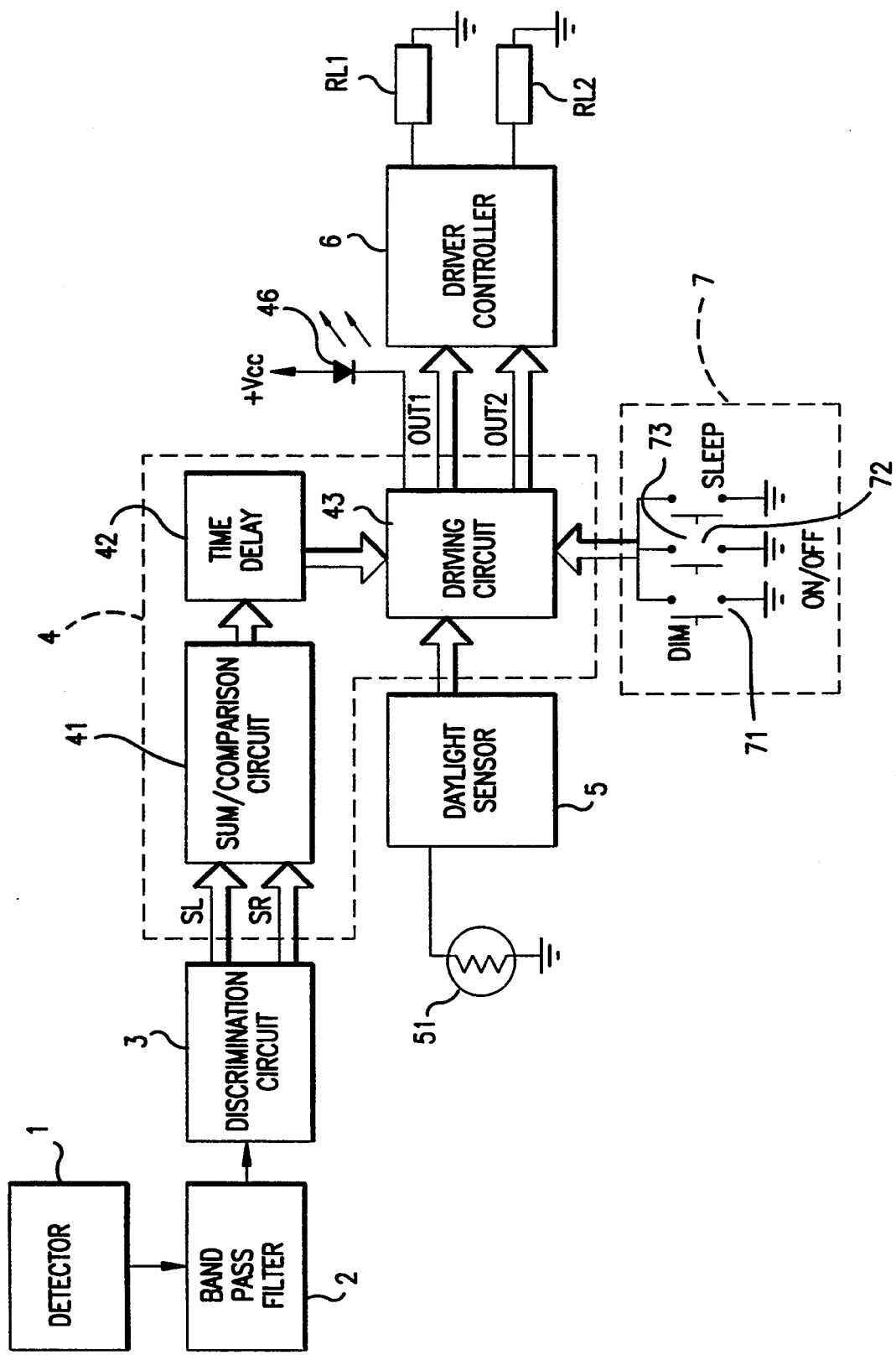
FIG. 1 is a block diagram of the present invention.

As shown in FIG. 1, the present invention is provided with a PIR (pyroelectric infra-red) motion detector 1 which is used to detect infrared energy emitted from the human body. The signal detected by the motion detector 1 is then coupled to a direction discrimination circuit 3 via a band pass filter and amplifier circuit 2 which amplifies the detected signal and filters unwanted frequency noise. The output terminal of the filter and amplifier circuit 2 is electrically connected to the direction discrimination circuit 3 which separates the detected signal into a left shift motion signal SL and SR representing the net transport of persons entering and leaving the room respectively which is supplied to a processing circuit 4 for count and comparison purposes.

The processing circuit 4 is comprised of a sum comparing circuit 41, a time delay circuit 42 and a driving circuit 43. The sum comparing circuit 41 counts, compares, and stores the left shift motion signal SL and right shift motion signal SR in order to determine the number of persons remaining in the room. When the number of persons entering the room is increased, the compare circuit 41 sends a logic high signal "1" (normally 5 volts) to the driving circuit 43 via the time delay circuit 42 and the driving circuit actuates the driver controller 6. Electric loads such as lights or other home appliances controlled by relays RL1 and RL2 are turned on under the control of the driving controller 6. When the number of persons entering into the room is less than the number of persons leaving the room, the output terminal of the sum comparing circuit 41 will send out a logic low signal "0" (normally 0 volt), and correspondingly turn off the electric loads.

The driving circuit 43 of the processing circuit 4 is further connected to a daylight sensing circuit 5 employing a light sensitive resistor 51 for sensing the luminance in the room environment. During daylight hours, the daylight sensing circuit 5 disables the driving circuit 43 and turns off an LED indicator 46 in the driving circuit 43 to save energy. Opposingly, at night, the daylight sensing circuit 5 enables the driving circuit 43 and turns on the LED indicator 46 to guide a user. The driving circuit 43 is also coupled to a switch control circuit 7 which includes a luminance adjusting key 71, a manually on/off key 72, and a sleep mode control key 73. The luminance adjusting key 71 is used to adjust the luminance of the controlled light. The manually on/off key 72 is used to manually turn the light on or off. The sleep mode control key 73 has the function of turning off the light after a predetermined time period from the initial time of key depression. When the user depresses the luminance adjusting key 71 and the sleep mode control key 73 simultaneously, the system will be initialized.

Figure 7:
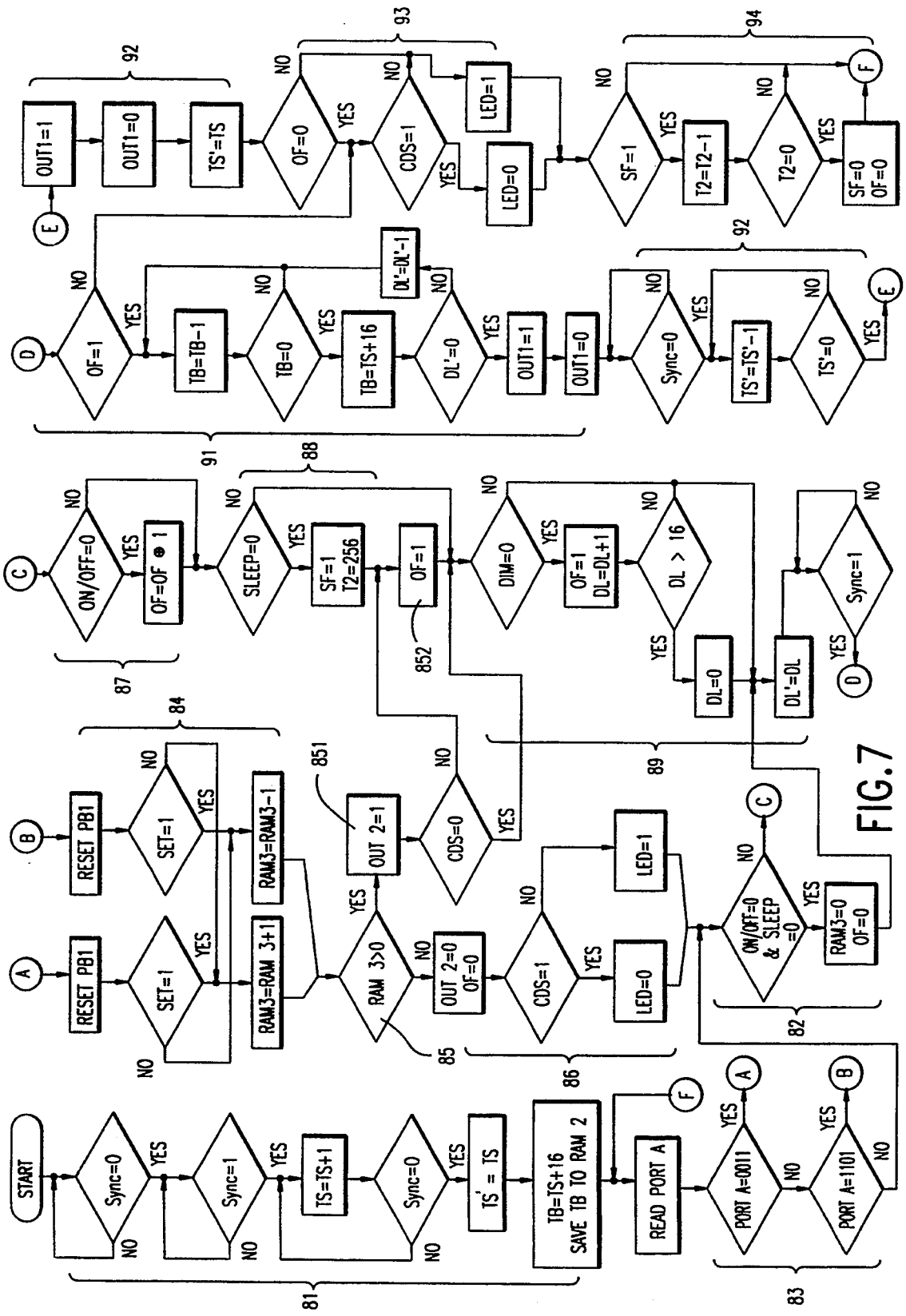
FIG. 7 shows the flow diagrams of the single-chip microcomputer in accordance with the present invention.

The sum comparing circuit 41, time delay circuit 42 and the driving circuit 43 of the processing circuit 4 may be a single chip microcomputer with particular control program or configured as an ASIC (Application Special Integrated Circuit). An exemplary flow diagram of the program in the microcomputer is shown in FIG. 7.

Figure 2:
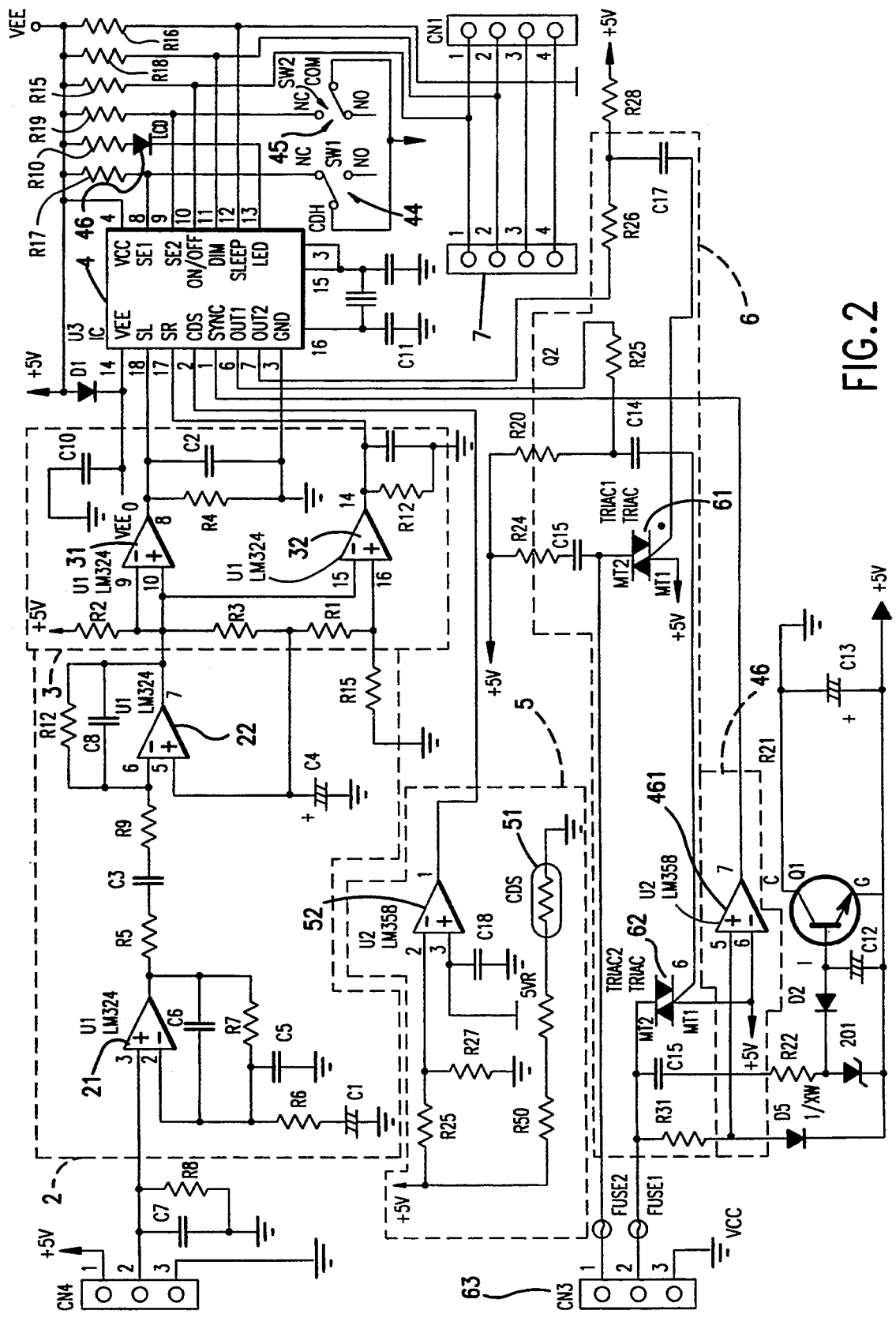
FIG. 2 shows the circuit arrangement of the present invention.

FIG. 2 shows the detailed circuit arrangement of the present invention. The band pass filter and amplifier circuit 2 mainly consisting of two operational amplifiers 21, 22 and associated elements such as resistors and capacitors. The direction discrimination circuit 3 is composed of two operational amplifiers 31, 32 which is used to receive the output signal from the filter and amplifier circuit 2 and separate the same into two separated signals, namely a left shift motion signal SL and a right shift motion signal SR, to input pins of the processing circuit 4.

Figure 3:
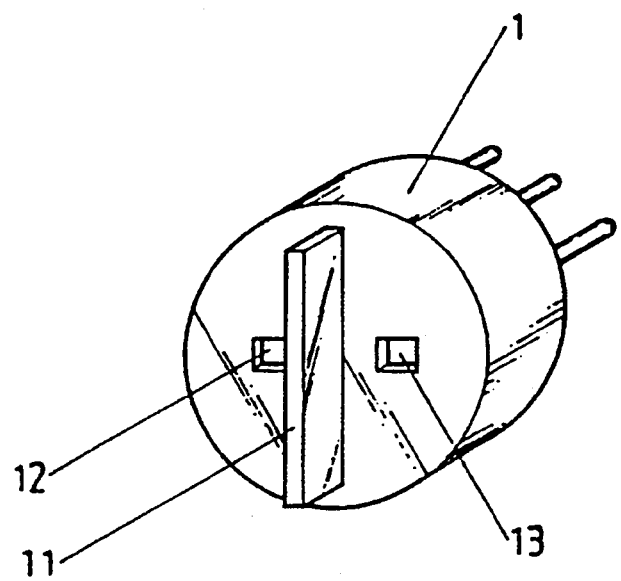
FIG. 3 shows the outer appearance of the motion detector of the present invention.
Figure 4:
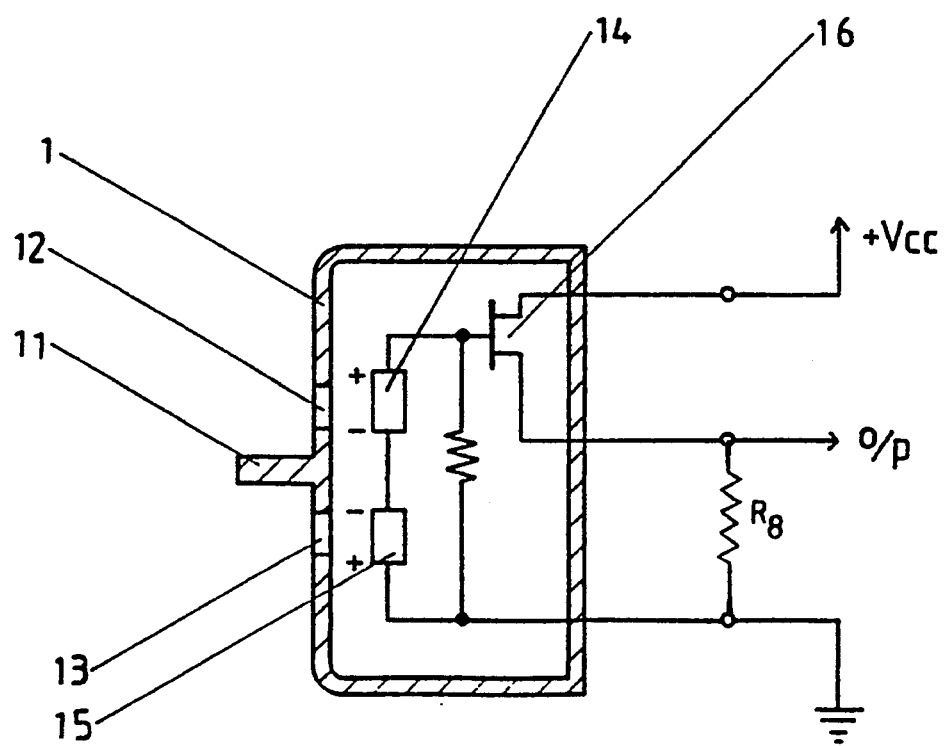
FIG. 4 shows the equivalent circuit of the detector shown in FIG. 3.

In accordance with the present invention, the PIR motion detector 1 serves as a detector capable of detecting the motion of persons entering and leaving a room. The assembly of the motion detector 1 is shown in FIGS. 3 and 4. The motion detector employs two sensing elements 14, 15 configured in a housing. Each sensing element may detect the outside infrared energy via individual windows 12 and 13. In front of the motion detector 1, there is secured a division plate 11 between the left window 12 and right window 13. In circuit arrangement, the left sensing element 14 is connected, in series, with the right sensing element 15 in a back-to-back configuration. The positive terminal of the sensing element 14 is connected to the Gate terminal of a FET transistor 16, while the positive terminal of the sensing element 15 is connected to ground. In such an arrangement, the motion detector 1 may properly detect the direction of the motion of persons entering or leaving the room, and correspondingly generate output signals with phase differences.

Figure 5A:
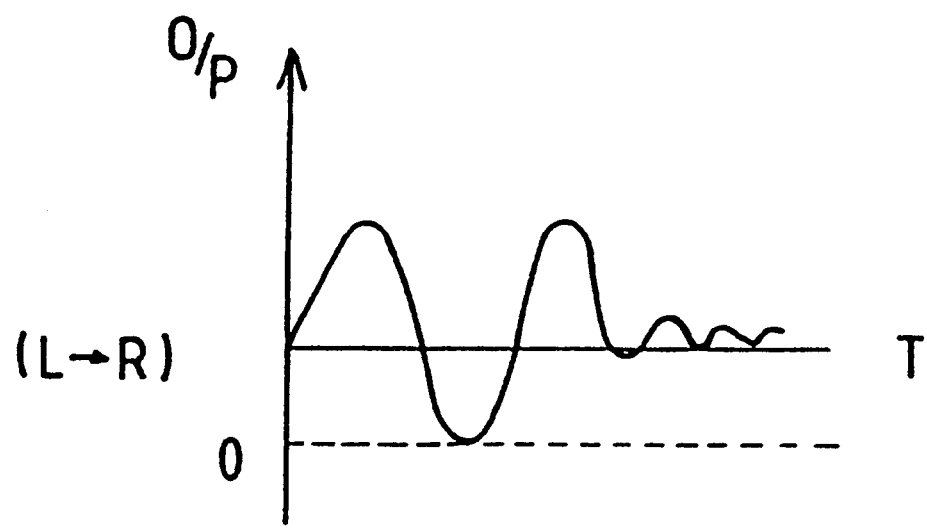
FIGS. 5A and 5B show the waveform detected by the detector shown in FIG. 3.

Due to the division of the division plate 11, when a person moves from left to right, the left sensing element 14 in window first detects the motion, and then the right sensing element 15 in window 13 detects the motion. Hence, the left sensing element will generate a positive voltage on its positive terminal, while the right sensing element 15 generates a lower positive voltage on its negative terminal. As a result, the Gate terminal of the transistor 16 will receive a positive voltage enough to trigger the transistor 16. The output waveform of the transistor in this status is shown in FIG. 5A, in which the output signal has a positive phase.

Figure 5B:
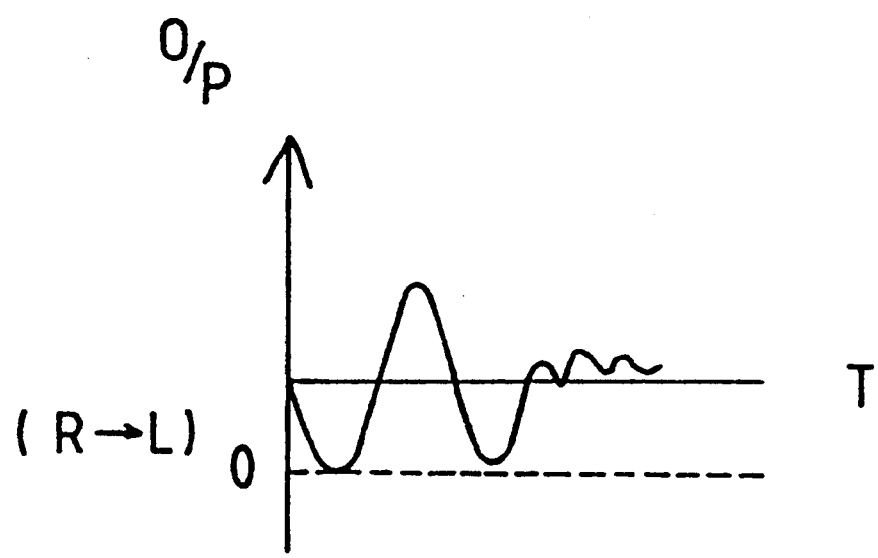

When a person moves from right to left, the right sensing element 15 first detects the motion, and then the left sensing element 14 detects the motion which causes the right sensing element 15 to generate a higher voltage while the left sensing element 14 generates a lower voltage. As a result, the transistor 16 will be turned off. The output waveform of the transistor in this status is shown in FIG. 5B, in which the output signal has a negative phase.

Figure 5D:
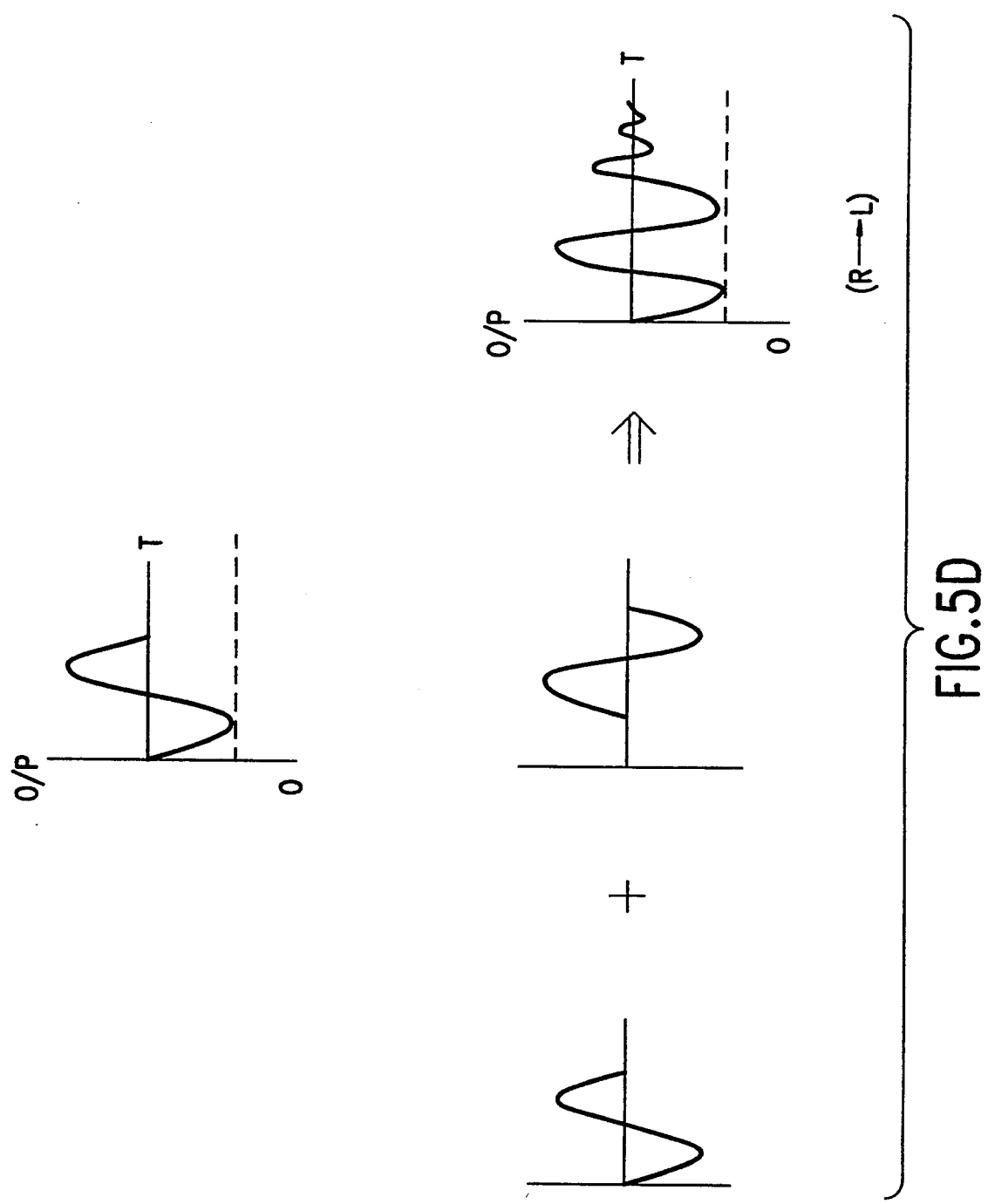
FIG. 5D shows a signal waveform when motion is detected in a second direction opposing the first direction.

In order to more fully clarify the PIR detector shown in FIG. 4, as provided in the circuitry described in FIGS. 1 and 2, attention is directed to FIG. 4 and FIGS. 5C and 5D. The PIR detector 1 serves to detect the motion direction of a person and generates output signals of differing phase.

In particular, the two sensing elements 14, 15 are connected in series to the gate of the FET transistor 16. The positive terminal of element 14 is connected to the gate of the FET and the negative terminal of sensing element 15 is coupled to the FET 16. Electrothermal effects are effected when sensing elements 14 and 15 receive approximately 9–10 μm of infrared energy emitted by a person resulting in a voltage between the elements 14 and 15.

When a person is located on a left side of detector 1 (on the side of window 12), sensing element 14 provides a voltage. Due to the fact that the positive terminal of the sensing element 14 is connected to the gate of the FET 16, the output terminal of the FET 1 generates a positive phase waveform as shown in FIG. 5C. Opposingly, when a person is located on a right side of detector 1 (on the side of window 13), sensing element 15 provides a voltage. Due to the fact that the negative terminal of the sensing element 15 is connected to the FET 16 gate in interrupted fashion, the FET 16 generates a negative phase waveform as shown in FIG. 5D.

When a person moves from the left to the right in front of detector 1, the sensing element 14 first receives the infrared energy and then the element 15 consecutively receives the energy where a responsive left-to-right signal SLR is generated at the output of the FET 16 where the waveform is shown in FIG. 5A.

Opposingly, when a person moves from the right to the left in front of detector 1, the sensing element initially receives the infrared energy followed by the energy receipt by element 14 and a right-to-left signal SRL is generated at the output of FET 16 with the SRL waveform shown in FIG. 5B.

In this manner, detector 1 detects directional movement of persons and generates differing phase output signals. The differing phased output signals pass to the discrimination circuit 3 for separation of the out-of-phase waveforms. The processing circuit then performs the usual operations of summing, processing, comparing and driving.

It will be noted from the above description, the PIR motion detector 1 of the present invention captures the motion direction of a person and then generates output signals with phase differences. The direction discrimination circuit 3 receives the output signal sent from the motion detector 1 and then sends out a left shift motion signal SL and a right shift motion signal SR to a processing circuit 4 to perform the functions of count and comparison.

As described above, the processing circuit 4 may be a single chip microcomputer, as shown in FIG. 2, the output terminal OUT1 of which is connected to the Gate terminal of a known current control element TRIAC 61 of the driver controller 6 while the output terminal OUT2 of the microcomputer is connected to the Gate terminal of TRIAC 62 of the driver controller 6. The terminals MT2 of the TRIACs 61, 62 are electrically connected to controlled electric loads, and may be arranged over terminal 63. The output terminal OUT1 of the microcomputer controls a controlled light, and the output terminal OUT2 controls other electric appliances. The CDS terminal of the processing circuit 4 is connected to the daylight sensing circuit 5 which is composed of an operational amplifier 52, a light sensitive resistor 51 and a variable resistor SVR. The sensitivity of the daylight sensing circuit 5 is adjusted by the variable resistor SVR. The key signal of the switch control circuit 7 is coupled to the input terminals DIM, ON/OFF, and SLEEP of the processing circuit 4. A synchronous circuit 46 containing an operational amplifier 461 is coupled to AC power source and senses a synchronous signal to the input terminal SYNC of the processing circuit 4 so that the processing circuit 4 may be synchronized with the frequency of the AC power source. Furthermore, the processing circuit 4 is provided with two selecting input terminals SE1, SE2, the state of which may be changed by switch 44, 45 for the purpose of changing the direction of motion detection. The changeable function provided by the switch 44, 45 may meet the requirements of installation of the detector which may be installed either at left or right side of a room.

Figure 6:
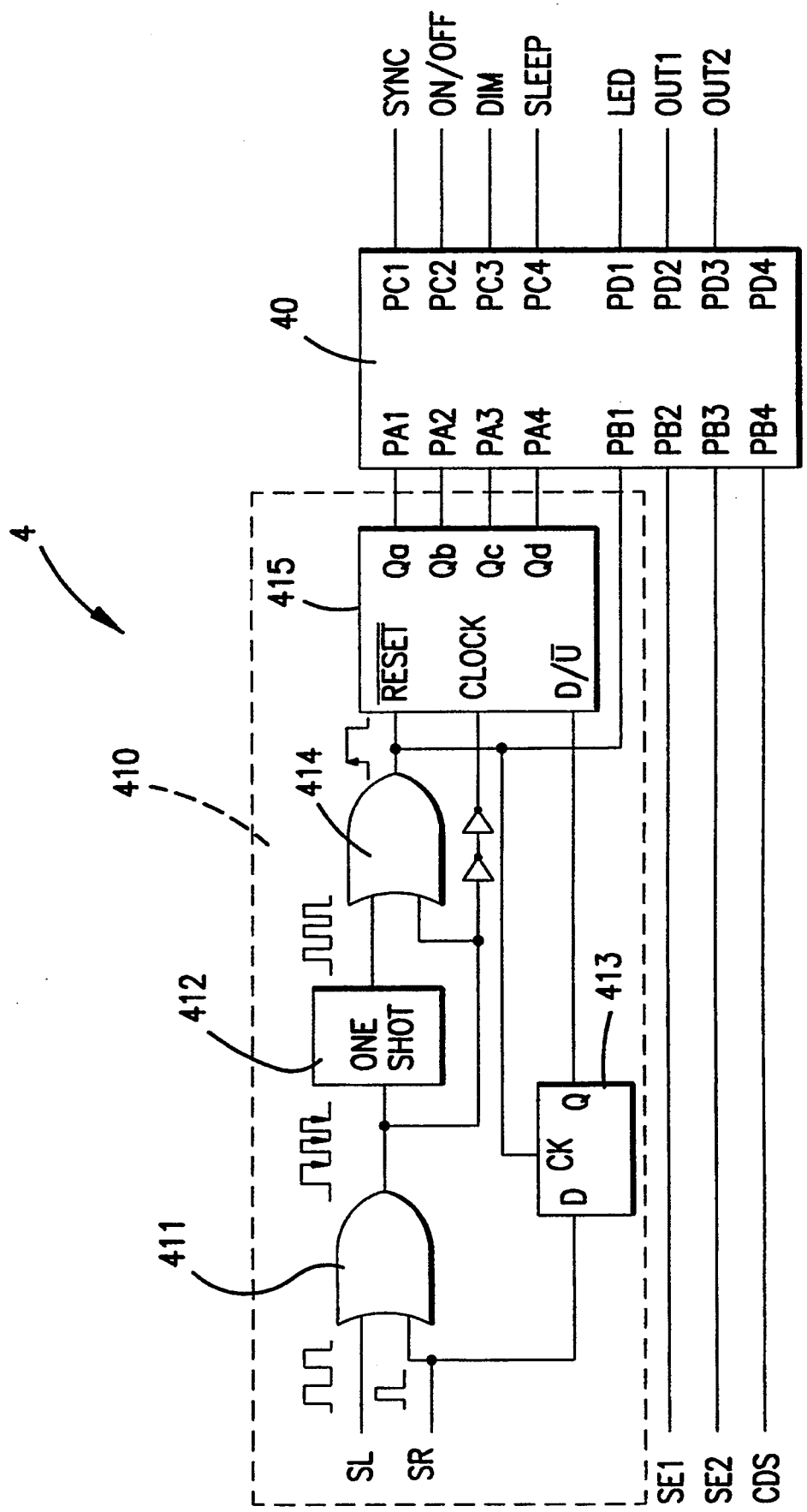
FIG. 6 shows the circuit diagram of the processing circuit of the present invention.

The detailed circuit arrangement of the processing circuit 4 is shown in FIG. 6. In the preferred embodiment, the processing circuit 4 is composed of a pre-processing circuit 410 and a single chip microcomputer 40. The pre-processing circuit 410 is composed of a first OR gate 411, a second OR gate 414, a one-shot triggering circuit 412, a Flip-Flop 413 and an integrated counter 415. The pre-processing circuit 410 can process the signals SL and SR before the signals enter into the microcomputer 40.

When a person moves from left to right, the direction discrimination circuit discussed above will send out a left shift motion signal SL and a right shift motion signal SR. The first OR gate 411 of the pre-processing circuit 410 will receive the two signals. In this situation, the signal SL is in a form of two spaced pulses while the signal SR is in a form of single pulse. The two signals will be combined by the OR gate 411 and then supplied to the clock input terminal of the counter 415 for counting. The combined signal is also supplied to the one-shot triggering circuit 412 to generate a signal train with narrow pulse width to be supplied to an input terminal of the second OR gate 414. The second OR gate 414 receives the output signal of the first OR gate 411 via its other input terminal, and then sends out a signal to a reset pin RESET of the counter 415 and clock input terminal CK of the Flip-Flop 413.

Besides, the right shift motion signal SR is supplied to an input terminal D of the Flip-Flop 413. The output terminal Q of the Flip-Flop 413 is connected with the counting mode terminal D/U of the counter 415. The output terminals Qa, Qb, Qc, Qd of the counter 415 are connected with an input port PA1–PA4 of the signal chip microcomputer 40. All the other terminals of the single chip microcomputer 40 are configured as output ports.

It will be noted that the pre-processing circuit 410 receives the signal SL, SR, and correspondingly sends out count signals in binary form via output of the counter 415 to the microcomputer 40. The reference waveforms shown in FIG. 6 are illustrated only for explanation by taking an example of a person who enters the room (i.e. the person moves from left to right). In this case, the signal SL leads the signal SR, and the signal SR is generated during the interval between the two pulses of signal SL. In such circumstances, the first OR gate 411 first receives the first positive edge of the signal SL before receiving the signal SR. At this time, the Flip-Flop 413 will send out a logic low signal "0" causing the counter 415 working in up counting mode. The counter 415 thereafter sends out a binary number of 0001 via output port to microcomputer 40.

In a similar way, when the person moves from right to left (i.e. leaves the room), the signal SR is in the form of two spaced pulses while the signal SL is in the form of only one pulse. Consequently, the counter 415 will be operated in down counting mode. As a result, the counter 415 sends out a binary number "1101" to the microcomputer 40. After the pre-process described above, the single chip microcomputer 40 may receive and count the binary numbers properly.

In the preferred embodiment of the present invention, most of the functions discussed above may be performed by a particular software programmed in the single chip microcomputer. The control flow diagram of the program contained in the single chip microcomputer is set forth in FIG. 7, and will be described as follows.

The program first performs a detecting step 81 checking the AC power source synchronous time period TS by detecting the synchronous signal SYNC sent from synchronous circuit 46 shown in FIG. 2. The program then sets a time delay TB equal to 1/16 time the time period TS and stores the value TS in a register TS'. Thereafter, reads the output signal of the output PORT (PA1–PA4) of the single chip microcomputer to perform the next step, direction discrimination step 83 which discriminates the status of person entering or leaving the room. In case that the PORT A of the microcomputer is "0001", performs branch A of a summing step 84 which first resets pin PB1 of the microcomputer and then increases register RAM3 by 1; in case that the PORT A of the microcomputer is "1101", performs branch B of the summing step 84 which first resets pin PB1 of the microcomputer and then decreases the register RAM3 by 1. A comparing step 85 checks if the number of the register RAMs is greater than "0" or not. If "yes", the number of persons entering the room is greater than that of persons leaving the room (i.e. the room still has persons therein), the program then performs the routine of turning on the lights 851 which first sets a register OUT2 to a value of 1 and thereafter checks whether the status of CDS is "0" or not. If not, the program sets a flag OF "1" which represents that the light is to be turned on. The program will be continuous to perform luminance adjusting step 89, positive half period luminance adjusting step 91, negative half period luminance adjusting step 92, indicator setting step 93, and sleep mode control step 94 in sequence.

In case the value of the register RAM3 in the comparing step 85 is greater than "0", and the status of CDS is "0", the environment is in daylight hours and there are still persons within the room. At this time, the program performs the step of turning the light off branch 86 in which the OF and OUT2 will be set to representing the light is not to be turned on. Then the program directly enters the flag setting step 89 and checks whether the luminance adjusting key 71 is depressed or not. If "yes", the OF will be set to logical high "1"; if not, the OF will remained at logical low "0". After the step of setting flag step 89, the program will perform the next step, positive half period luminance adjusting step 91 and negative half period luminance adjusting step 92, status indicating setting step 93 and sleep mode control step 94 in sequence, and then return to the step of direction judging step 83 repeat reading the data of Port A of the microcomputer.

In the control flow discussed above, if the value of register RAM3 is "0" in the step 85, it represents that the persons entering the room have completely left the room. The program will set the OUT2 to "0" and the OF to "0" to turn the light off. In this branch, it also detects the status of the CDS. If the status of CDS is "1", it represents the environment is in night. The program will then set the status of LED to "0" to turn on the LED indicator 46 shown in FIG. 1. If the status of CDS is not "1", it represents the environment is in daylight hours, the program will correspondingly set the LED to "1" and turn the indicator 46 off. This step is used to turn on and off the indicator 46 automatically in accordance with the luminance of the environment.

In case no person enters or leaves the room, the program will directly perform the memory clearing step 82 after the direction judging step 83. This step will first set the value of register RAM3 and OF to "0" on detection of the depression of manually on/off key 72 and sleep mode control key 73 shown in FIG. 1 to clear the memory of the microcomputer and turn off the light.

It will be noted that the value in the register RAM3 is always greater than "0" or equal to "0" in normal condition. It is possible that the value in register RAM3 is less than "0" if the user depresses the manually on/off key 72 and sleep mode control key 73 trying to clear the memory when there are still persons remaining in the room. To overcome this problem, the present invention defaults to no person in the room when detecting the value of register RAM3 is equal to "0" or less than "0". That is, when the value of the register RAM3 is less than "0", the user can reset the system by depressing the manually on/off key and sleep mode control key simultaneously.

In the step 82, if the manually on/off key and the sleep mode control key are not depressed, the program performs the on/off key testing step 87 checking whether the manual on/off key is depressed or not, and performs the sleep mode control key testing step 88 setting flag SF to "1" and setting a delay time T2 to a value of 256. Thereafter, the program performs the luminance adjusting step 89, positive half period luminance adjusting step 91, negative half period luminance adjusting step 92, indicator setting step 93 and sleep mode control step 94 in sequence.

In the luminance adjusting step 89, when the luminance adjusting key 71 is depressed, the program will increase a delay time DL. When the delay time DL exceeds a value of 16, the number will be set to "0" and register in a register DL', and then the program enters the positive half period luminance adjusting step 91. In the step 91, the program first performs the delay time stored in the TB obtained by step 81, and then decreases the value of register DL'. Therefore, this step serves as a time delay function. At the end of delay time, OUT will be set to "1" to trigger the TRIAC 61 during the positive half period. The light may be changed by adjusting the delay time.

In the negative half period luminance adjusting step 92, the program sets OUT1 to send out a triggering pulse at the final stage of this step. The step 93 acts as a setting step to turn the LED indicator on or off according to the status of flags OF and CDS. Step 93 is a sleep mode control step which provides a time delay by decrement a preset delay time T2. When the delay time is reached, the flag SF and OF is set to "0" to turn the light off in order to save power consumption.

I claim:

1. An automatic switch for controlling electric appliances comprising:
   a motion detector for generating a sensed signal;
   a filter and amplifier circuit for amplifying the sensed signal of the motion detector;
   a direction discrimination circuit connected to an output terminal of said filtering amplifier circuit for receiving the amplified sensed signal, said direction discrimination circuit comprising two comparators for separating the signal sent from the filter and amplifier circuit into a left shift and right shift motion signal with phase differences; and
   a processing circuit comprising a sum comparator and a driving circuit having a LED indicator, wherein the sum comparator receives the left and right shift motion signal and compares the number of persons entering into a room with that of persons leaving the room, and then turns the electric appliances on or off by said driving circuit according to the output signal of the sum comparator;
   whereby when the number of persons entering a room is greater than that of the number of persons leaving the room, the driving circuit turns on the electric appliances and when the number of persons entering the room is equal to that of the number of persons leaving the room, the driving circuit turns off the electric appliances.

2. The switch as claimed in claim 1, wherein said processor circuit is a single chip microcomputer with two input ports, one of the input ports being connected to a daylight sensing circuit and the other input port being connected to a keypad input circuit, said daylight sensing circuit being composed of a light sensitive resistor for sensing the luminance of environment, a comparator for comparing the luminance with a predetermined value, and a variable resistor for adjusting the triggering sensitivity of the circuit, the daylight sensing circuit being used to disable the driving circuit of the processing circuit and turn off the LED indicator during daylight hours; while the daylight sensing circuit being used to enable the driving circuit of the processing circuit and turn on the LED indicator during night.

3. The switch as recited in claim 1, wherein the processing circuit further comprising a time delay circuit interposed between the sum comparing circuit and said driving circuit.

4. The switch as recited in claim 1, including a switch control circuit comprising a luminance adjusting key, a manually on/off key, and a sleep mode control key, on depression of the manually on/off key and the sleep mode control key simultaneously to reset the processing circuit.

5. The switch as claimed in claim 1, wherein said direction discrimination circuit is composed of two operational amplifiers for generating two separated signals with phase difference to the processing circuit for count and comparison.

6. The switch as claimed in claim 1, wherein said processing circuit comprises a pre-processing circuit consisting of two OR gates, a one-shot triggering circuit, an up/down counter, and a Flip-Flop, said pre-processing circuit receiving the signal of direction discrimination circuit and then generating two different sets signals in binary form to the processing circuit.

7. The switch as claimed in claim 1, wherein the motion detector comprise two sensing elements arranged in a housing, the sensing elements being connected in a manner of back-to-back configuration and detecting the outside infrared energy through window on the housing, and a division plate being secured in front of the housing for dividing the sensing elements.

* * * * *